(12) United States Patent
Imamura et al.

(10) Patent No.: US 7,397,627 B2
(45) Date of Patent: Jul. 8, 2008

(54) METHOD OF DETECTING POSITION OF HEAD FOR RECORDING MEDIUM

(75) Inventors: Takahiro Imamura, Kawasaki (JP); Arata Ejiri, Kawasaki (JP); Yutaka Nakamura, Kawasaki (JP); Ken-ichi Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/141,686

(22) Filed: May 31, 2005

(65) Prior Publication Data

US 2006/0187570 A1      Aug. 24, 2006

(30) Foreign Application Priority Data

Feb. 24, 2005      (JP)      ............... 2005-048402

(51) Int. Cl.
*G11B 5/596*      (2006.01)
(52) U.S. Cl. ............... 360/77.06; 360/77.02; 360/77.08
(58) Field of Classification Search ........................ None
See application file for complete search history.

(56) References Cited

U.S. PATENT DOCUMENTS

| 3,126,535 | A |   | 3/1964  | Streeter |
| 4,197,564 | A |   | 4/1980  | Ravizza |
| 4,285,017 | A |   | 8/1981  | Arter et al. |
| 4,506,149 | A |   | 3/1985  | Utsumi |
| 4,633,451 | A | * | 12/1986 | Ahn et al. ............... 369/14 |
| 5,001,579 | A | * | 3/1991  | Compton ............... 360/77.06 |
| 5,010,423 | A |   | 4/1991  | Sakaegi et al. |
| 5,138,511 | A |   | 8/1992  | Hoshimi et al. |
| 6,440,520 | B1 |  | 8/2002  | Baglin et al. |
| 6,927,929 | B2 | * | 8/2005 | Gong et al. ............... 360/31 |
| 7,079,344 | B2 | * | 7/2006 | Nikitin ............... 360/55 |
| 7,236,327 | B2 | * | 6/2007 | Kim et al. ............... 360/131 |
| 2002/0089778 | A1 | * | 7/2002 | Shimokoshi et al. ...... 360/77.02 |
| 2003/0112547 | A1 | * | 6/2003 | Koso et al. ............... 360/78.05 |
| 2003/0234998 | A1 | * | 12/2003 | Magnusson ............... 360/64 |
| 2005/0152058 | A1 | * | 7/2005 | Schmidt ............... 360/60 |
| 2005/0174680 | A1 | * | 8/2005 | Spaur et al. ............... 360/77.02 |
| 2006/0028772 | A1 | * | 2/2006 | Raastad ............... 360/315 |

FOREIGN PATENT DOCUMENTS

EP      0 339 851      11/1989

(Continued)

*Primary Examiner*—Andrew L. Sniezek
(74) *Attorney, Agent, or Firm*—Greer, Burns & Crain, Ltd.

(57) ABSTRACT

A head is moved in a lateral direction on the boundary between a separation track and a recording track on a recording medium. The separation track isolates the adjacent recording tracks from each other. A variation is detected in the output supplied from the head based on the recording track. Positional information indicating the position of the head is generated based on the variation. The output supplied from the head varies in response to the movement in the lateral direction, namely the elapsed time. The positional information can thus be generated based on the variation in the output. The generated positional information contributes to an accurate positioning in a facilitated manner. Moreover, information required to position the head can be omitted from the recording medium. The processes can be simplified in the production of the recording medium. The operation time can thus be shortened.

11 Claims, 9 Drawing Sheets

FOREIGN PATENT DOCUMENTS

| | | |
|---|---|---|
| EP | 0 511 622 | 11/1992 |
| EP | 0 994 467 | 4/2000 |
| JP | 49-020208 | 5/1974 |
| JP | 52-100213 | 8/1977 |
| JP | A 54-71659 | 6/1979 |
| JP | A 58-73023 | 5/1983 |
| JP | A 58-102368 | 6/1983 |
| JP | A 59-142786 | 8/1984 |
| JP | 59-227073 | 12/1984 |
| JP | A 61-32274 | 2/1986 |
| JP | 62-038572 | 2/1987 |
| JP | 62-195714 | 8/1987 |
| JP | 62-273681 | 11/1987 |
| JP | 63-263676 | 10/1988 |
| JP | 64-039664 | 2/1989 |
| JP | A 4-102278 | 4/1992 |
| JP | 6-195907 | 7/1994 |
| JP | 62-203352 | 7/1994 |
| JP | A 6-203352 | 7/1994 |
| JP | 11-96708 | 4/1999 |
| JP | 2000-123501 | 4/2000 |
| JP | 2003-263850 | 9/2003 |

\* cited by examiner

METHOD OF DETECTING POSITION OF HEAD FOR RECORDING MEDIUM

BACKGROUND OF THE INVENTION

1. Field of the Invention

The present invention relates to a recording medium drive allowing a head to be positioned on a recording track on a recording medium.

2. Description of the Prior Art

A so-called discrete track medium is well known. The medium of this type includes separation tracks each isolating the adjacent recording tracks. Data sectors and servo sectors are alternately arranged on the recording track in the circumferential direction. The information is read out of the servo sector for positioning the head on the recording track.

A method of making the aforementioned medium includes forming the recording tracks and the separation tracks on a substrate. The magnetic information is written into the servo sectors on the recording medium. However, it is difficult to position the magnetic information on the recording tracks. The working time gets increased in positioning the magnetic information with a higher accuracy. The production cost thus increases.

SUMMARY OF THE INVENTION

It is accordingly an object of the present invention to provide a method of detecting the position of a head related to a recording medium with a higher accuracy in a facilitated manner. It is an object of the present invention to provide a recording medium drive allowing the detection of the position of a head related to a recording medium with a higher accuracy in a facilitated manner.

According to a first aspect of the present invention, there is provided a method of detecting the position of a head in a recording medium drive, comprising: moving the head in a lateral direction on the boundary between a separation track and a recording track, said separation track isolating adjacent recording tracks from each other; detecting a variation in the output supplied from the head based on the recording track; and generating positional information indicating the position of the head based on the variation.

The head moves in the lateral direction on the boundary between the recording track and the separation track. The output supplied from the head based on the recording track varies in response to the movement in the lateral direction, namely the elapsed time. The positional information indicating the position of the head can be generated based on the variation in the output. The generated positional information contributes to an accurate positioning in a facilitated manner. Moreover, information required to position the head can be omitted from the recording medium. The processes can be simplified in the production of the recording medium. The operation time can thus be shortened.

The method may further comprise moving the head toward the centerline of the recording track based on the positional information. The movement of the head toward the centerline of the recording track corresponds to the tracking servo control. The tracking servo control allows the head to follow the recording track with a higher accuracy.

The method may further comprise: positioning the head over a first section on the recording track when the head is moved; and positioning the head over a second section adjacent the first section on the recording track so as to allow a write operation of the head. The write operation can be effected over the second section after the head is positioned with a higher accuracy over the first section. The write operation of the head can be achieved at positions with a higher accuracy. Magnetic information for positioning may be written into the second section. The fine positioning of the head over the first section leads to the fine positioning of the magnetic information for positioning with a higher accuracy over the second section. The tracking servo control can be achieved with a higher accuracy on the recording medium including the magnetic information written into in the aforementioned manner.

According to a second aspect of the present invention, there is provided a recording medium drive comprising: a recording medium defining a separation track isolating adjacent recording tracks from each other; a head opposed to the recording medium; a driving mechanism supporting the head so as to moving the head in a lateral direction of the recording tracks; a controller circuit designed to detect variation of an output supplied from the head moving in the lateral direction of the recording track on a boundary between the separation track and at least one of the recording tracks, said controller circuit controlling operation of the driving mechanism based on the variation.

The recording medium drive allows the head to move in the lateral direction on the boundary between the recording track and the separation track. The output supplied from the head based on the recording track varies in response to the movement in the lateral direction, namely the elapsed time. The controller circuit is allowed to control the driving mechanism based on the variation in the output. The head can thus be positioned with a higher accuracy in a facilitated manner. Moreover, information required to position the head can be omitted from the recording medium. The processes can be simplified in the production of the recording medium. The operation time can thus be shortened.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
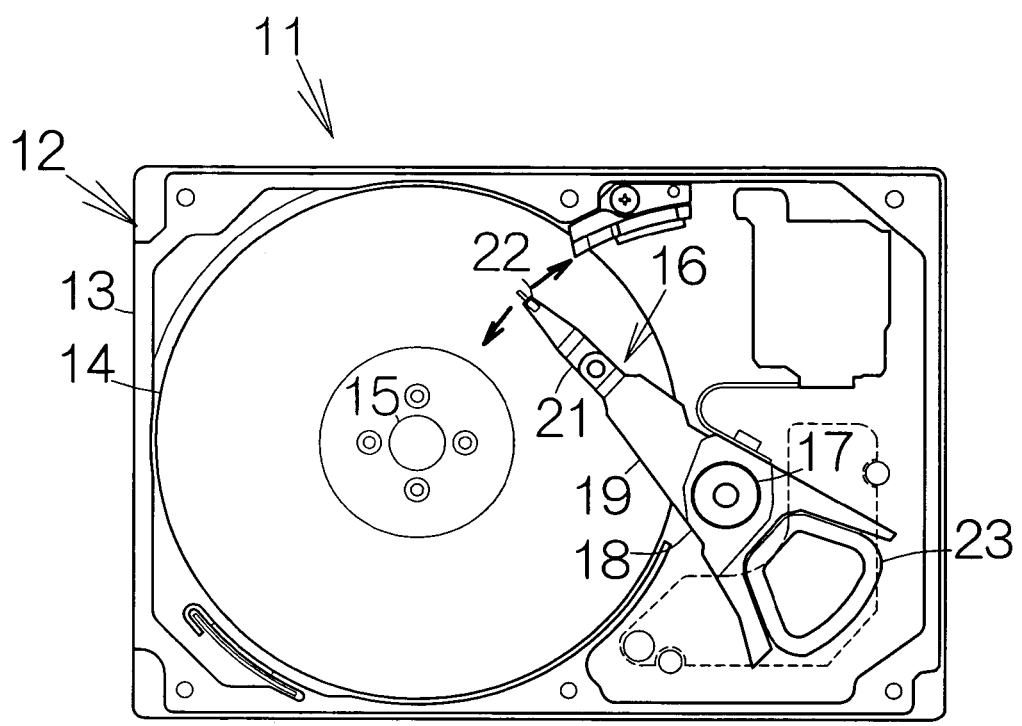
FIG. 1 is a plan view schematically illustrating the structure of a hard disk drive as an example of a recording medium drive according to the present invention.

FIG. 1 schematically illustrates the inner structure of a hard disk drive (HDD) 11 as an example of a recording disk drive or storage device according to an embodiment of the present invention. The HDD 11 includes a box-shaped enclosure 12. The enclosure 12 has an enclosure body 13 defining an inner space of a flat parallelepiped, for example. The enclosure body 13 may be made of a metallic material such as aluminum, for example. Molding process may be employed to form the enclosure body 13. A cover, not shown, is coupled to the enclosure body 13 so as to define the closed inner space between the enclosure body 13 and the cover itself. Pressing process may be employed to form the cover out of a single plate such as an aluminum plate, for example.

A printed circuit board, not shown, is attached to the outside of the enclosure body 13. LSI chips such as a microprocessor unit (MPU), a hard disk controller (HDC), and the like, and a connector are mounted on the printed circuit board. The MPU and the hard disk controller serve to control the operation of the hard disk drive 11. The connector is designed to receive cables for control signals and electric power extending from a main board of a host computer, for example. Electric power is supplied to the MPU and the hard disk controller for operations through the cables for electric power.

At least one magnetic recording disk 14 as an example of a recording medium is incorporated in the inner space of the enclosure 12. The magnetic recording disk or disks 14 is mounted on the driving shaft of a spindle motor 15. The spindle motor 15 is allowed to drive the magnetic recording disk or disks 14 for rotation at a higher revolution speed such as 5,400 rpm, 7,200 rpm, 10,000 rpm, or the like, for example.

A head actuator 16 serving as a driving mechanism is also incorporated in the inner space of the enclosure 12. The head actuator 16 comprises an actuator block 18. The actuator block 18 is coupled to a vertical support shaft 17 for relative rotation. Rigid actuator arms 19 are defined in the actuator block 18 so as to extend in the horizontal direction from the vertical support shaft 17. The actuator arms 19 are related to the front and back surfaces of the magnetic recording disk 14. The actuator block 18 maybe made of aluminum. Molding process maybe employed to form the actuator block 18.

Head suspensions 21 are fixed to the corresponding tip ends of the actuator arms 19 so as to further extend in the forward direction from the actuator arms 19. As conventionally known, a flying head slider 22 is supported at the front end of the individual head suspension 21. The flying head slider 22 is opposed to the surface of the magnetic recording disk 14.

An electromagnetic transducer, not shown, is mounted on the flying head slider 22. The electromagnetic transducer may include a read element and a write element. The read element may include a giant magnetoresistive (GMR) element or a tunnel-junction magnetoresistive (TMR) element designed to discriminate magnetic bit data on the magnetic recording disk 14 by utilizing variation in the electric resistance of a spin valve film or a tunnel-junction film, for example. The write element may include a thin film magnetic head designed to write magnetic bit data into the magnetic recording disk 14 by utilizing a magnetic field induced at a thin film coil pattern.

The head suspension 21 serves to urge the flying head slider 22 toward the surface of the magnetic recording disk 14. When the magnetic recording disk 14 rotates, the flying head slider 22 is allowed to receive airflow generated along the rotating magnetic recording disk 14. The airflow serves to generate a positive pressure or lift on the flying head slider 22. The flying head slider 22 is thus allowed to keep flying above the surface of the magnetic recording disk 14 during the rotation of the magnetic recording disk 14 at a higher stability established by the balance between the urging force of the head suspension 21 and the lift. As conventionally known, in the case where two or more of the magnetic recording disk 14 are incorporated in the enclosure 12, a pair of the actuator arm 19 and head suspension 21 is located in a space between the adjacent magnetic recording disks 14.

A power source such as a voice coil motor 23 is coupled to the actuator block 18. The voice coil motor 23 serves to drive the actuator block 18 for rotation around the support shaft 17. The rotation of the actuator block 18 induces the swinging movement of the actuator arms 19 and the head suspensions 21. When the actuator arm 19 is driven to swing about the support shaft 17 during the flight of the flying head slider 22, the flying head slider 22 is allowed to move along the radial direction of the magnetic recording disk 14.

Figure 2:
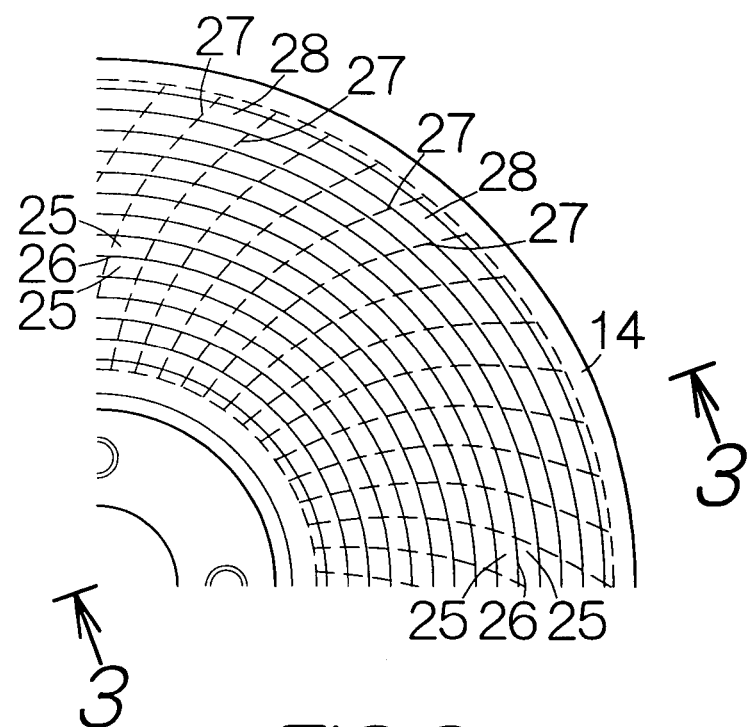
FIG. 2 is a partial plane view of a magnetic recording disk incorporated in the hard disk drive.

FIG. 2 schematically illustrates the structure of the magnetic recording disk 14 according to a first embodiment of the present invention. As shown in FIG. 2, stripes of recording tracks 25, 25, . . . , are defined on the front and back surfaces of the magnetic recording disk 14. The recording tracks trace concentric circles. The recording tracks 25 are made of a magnetic material. Magnetic information is recorded in the recording tracks 25. A non-recording or separation track 26 is interposed between the individual adjacent ones of the recording tracks 25, 25 so as to isolate the adjacent recording tracks 25, 25 from each other. The separation tracks 26 likewise trace concentric circles to extend in the circumferential direction of the magnetic recording disk 14. The separation tracks 26 are made of a non-magnetic material.

Bent servo sectors 27 of sixty stripes, for example, are defined on the front and back surfaces of the magnetic recording disk 14 so as to extend in the radial direction of the magnetic recording disk 14. The servo sector 27 serves as a first section according to the present invention. Servo patterns are not established in the servo sectors 27 in this case. The shape of the servo sector 27 depends upon the movement path of the electromagnetic transducer. Data sectors 28 are established between the adjacent servo sectors 27. The data sector 28 serves as a second section according to the present invention. Magnetic information is held in the recording tracks 25 within the data sectors 28. The servo sectors 27 and the data sectors 28 are alternately located on the individual recording tracks 25.

Figure 3:
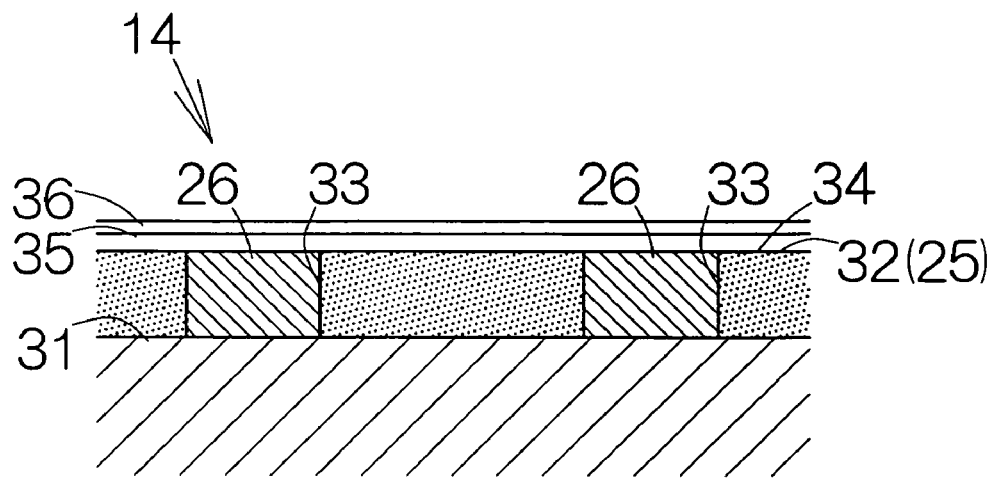
FIG. 3 is an enlarged partial sectional view taken along the line 3-3 in FIG. 2.

As shown in FIG. 3, the magnetic recording disk 14 includes a substrate 31. A glass substrate may be utilized as the substrate 31, for example. A magnetic layer 32 is overlaid on the surface of the substrate 31. The recording tracks 25 are established in the magnetic layer 32. Grooves 33 are formed in the magnetic layer 32. The grooves 33 are filled with a non-magnetic material. The non-magnetic material in the grooves 33 corresponds to the separation tracks 26. Here, the width of the recording track 25 may be set at approximately four times the width of the separation track 26. A flat surface 34 is defined over the surfaces of the recording tracks 25 and separation tracks 26. The flat surface 34 may be covered with a protection layer 35, such as a diamond-like-carbon (DLC) film, a lubricating film 36, such as a perfluoropolyether (PFPE) film, and the like, for example. The magnetic recording disk 14 of the type is suitable for in-plane magnetic recording. The axis of easy magnetization is set in the magnetic layer 32 in the direction in parallel with the surface of the magnetic layer 32. The south poles and the north poles are alternately established at uniform intervals on the recording tracks 25 within the servo sectors 27.

Figure 4:
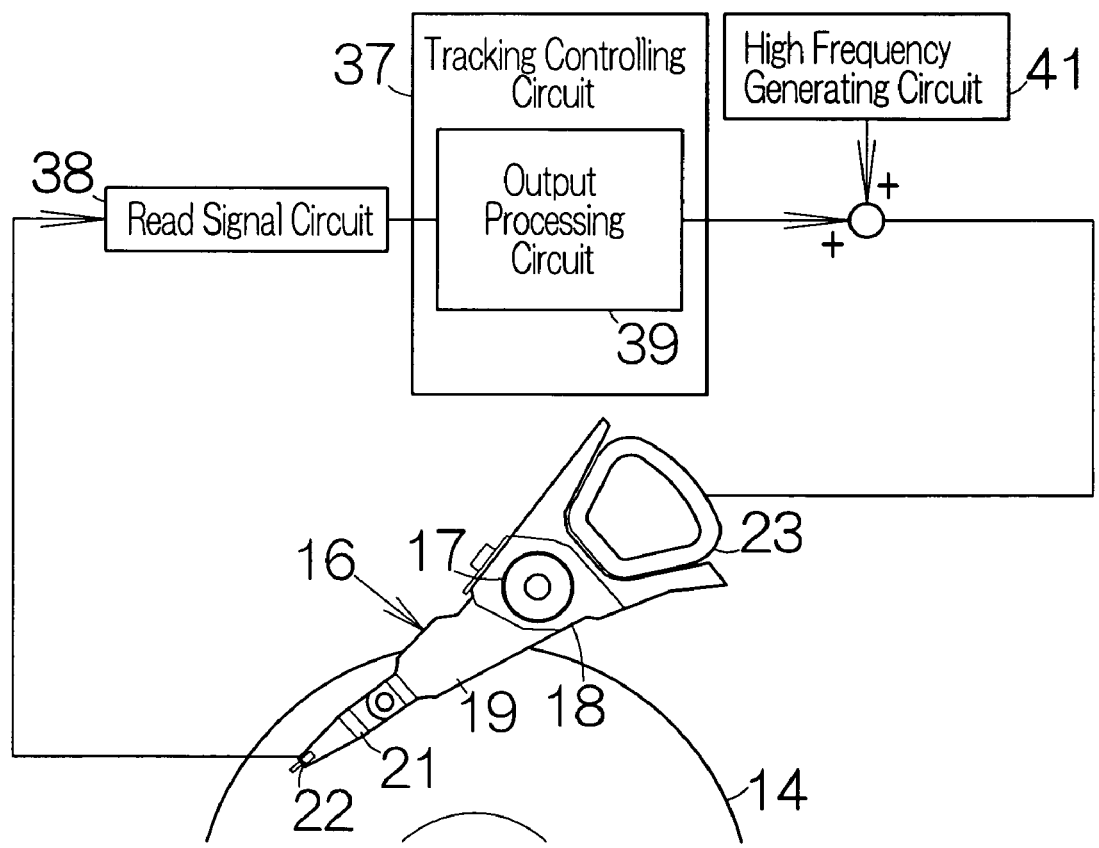
FIG. 4 is a block diagram schematically illustrating a system for tracking servo control.

As shown in FIG. 4, a tracking controlling circuit 37 as a controller circuit is incorporated within the hard disk drive 11. The tracking controlling circuit 37 is designed to realize a tracking servo control based on reproduction signals supplied from the read element of the electromagnetic transducer. The amount or quantity of the rotation of the head actuator 16 around the support shaft 17 is determined in the tracking servo control based on the deviation between the electromagnetic transducer on the flying head slider 22 and a predetermined orbit. The head actuator 16 serves to move the flying head slider 22 toward the centerline of the target recording track 25. The tracking servo control enables tracking of the electromagnetic transducer right on the target recording track 25 on the magnetic recording disk 14.

A read signal circuit 38 is connected to the tracking controlling circuit 37 so as to supply the tracking controlling circuit 37 with the reproduction signals from the read element. The read signal circuit 38 is designed to supply the read element with a sensing current. The variation in the electric resistance at the read element appears in the voltage level of the sensing current. The reproduction signals are then supplied to an output processing circuit 39 in the tracking controlling circuit 39. The output processing circuit 39 detects the variation in the output level of the reproduction signals. The output processing circuit 39 generates positional information specifying the position of the electromagnetic transducer based on the detected variation. A control signal is generated based on the positional information. The control signal is supplied to the voice coil motor 23. The head actuator 16 is driven for rotation around the support shaft 17 in accordance with the magnitude of the control signal. The head actuator 16 rotates around the support shaft 17 so as to cancel the deviation between the electromagnetic transducer and the centerline of the target recording track 25. The tracking servo control is in this manner realized.

A high frequency generating circuit 41 is connected to the tracking controlling circuit 37. The high frequency generating circuit 41 intermittently multiplexes a high frequency on the control signal generated at the tracking controlling circuit 37. The frequency of the high frequency may be set sufficiently higher than the servo band employed in the tracking servo control. The voice coil motor 23 drives the head actuator 16 based on the control signal. At the same time, the high frequency serves to induce vibration in the head actuator 16. The high frequency higher than the servo band fails to influence the tracking servo control.

Figure 5:
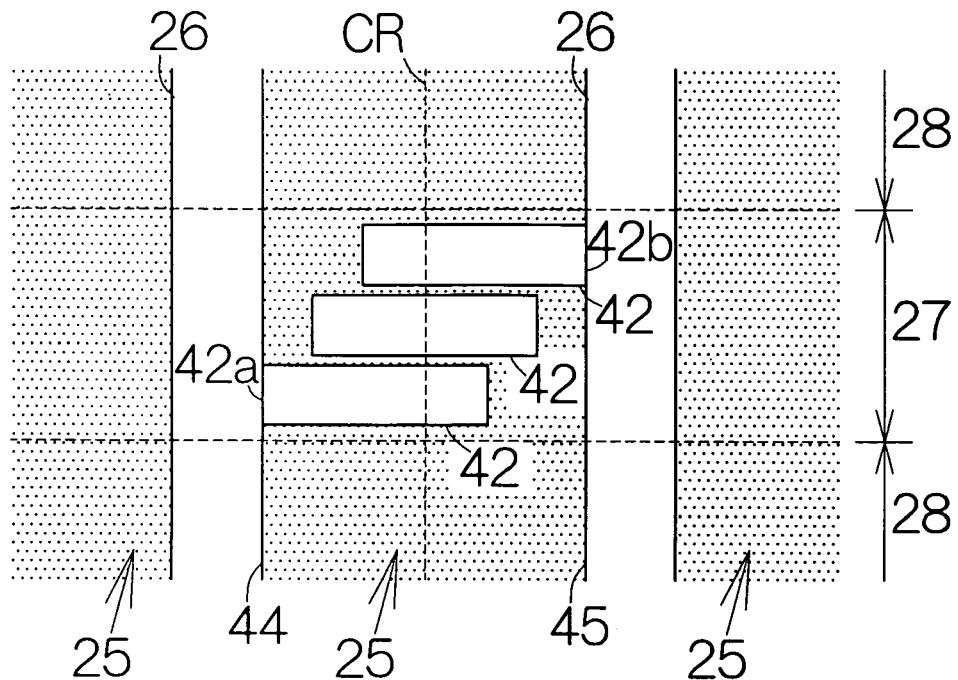
FIG. 5 is a partial plan view of the magnetic recording disk for illustrating the position of a read element exhibiting the maximum output value.
Figure 6:
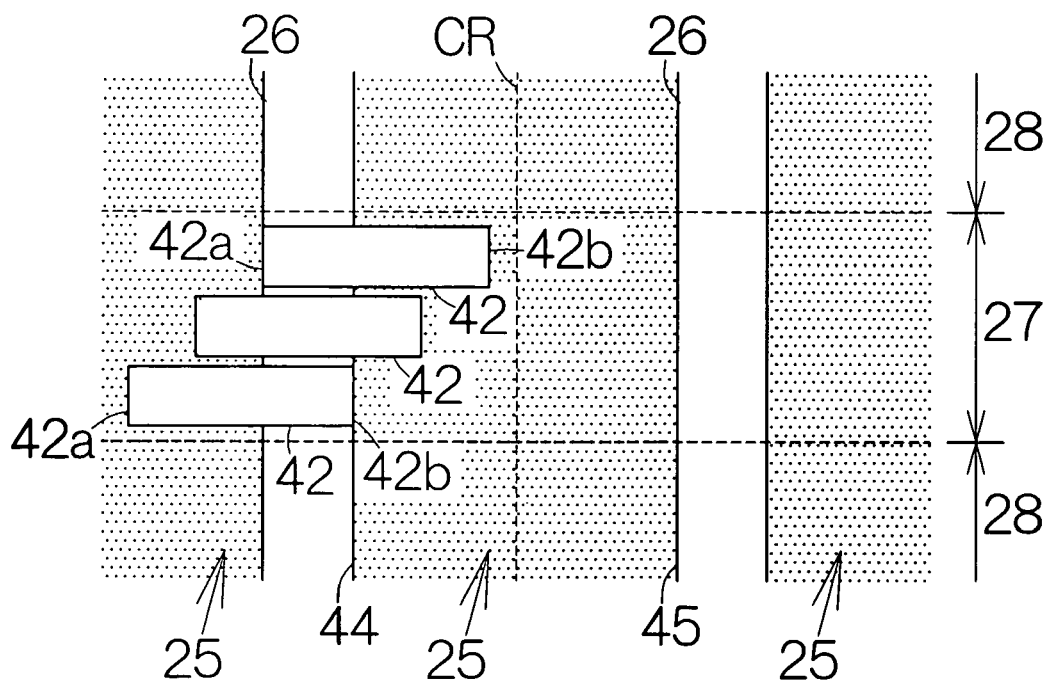
FIG. 6 is a partial plan view of the magnetic recording disk for illustrating the position of the read element exhibiting the minimum output value.

If the read element 42 receives the magnetic field from the recording track 25 over the entire area of the read element 42, the output of the read element 42 takes the maximum value. Here, as long as the outer edge 42a and the inner edge 42b of the read element 42 stays within the recording track 25, as shown in FIG. 5, the read element 42 maintains the output of the maximum level. As the outer edge 42a or the inner edge 42b deviates from the recording track 25, the output of the read element 42 decreases. When the read element 42 receives the magnetic field concurrently from the adjacent recording tracks 25, 25, as shown in FIG. 6, the output of the read element 42 takes the minimum value based on the full influence of the separation track 26 located between the adjacent recording tracks 25, 25. It should be noted that the output of the read element 42 takes the minimum value if the outer edge 42a stays on an inner boundary 45, or if the inner edge 42b stays on an outer boundary 44. The output of the read element 42 thus varies in response to the movement in the radial direction of the magnetic recording disk 14 based on the distribution of the magnetic field leaked out of the recording tracks 25.

Figure 7:
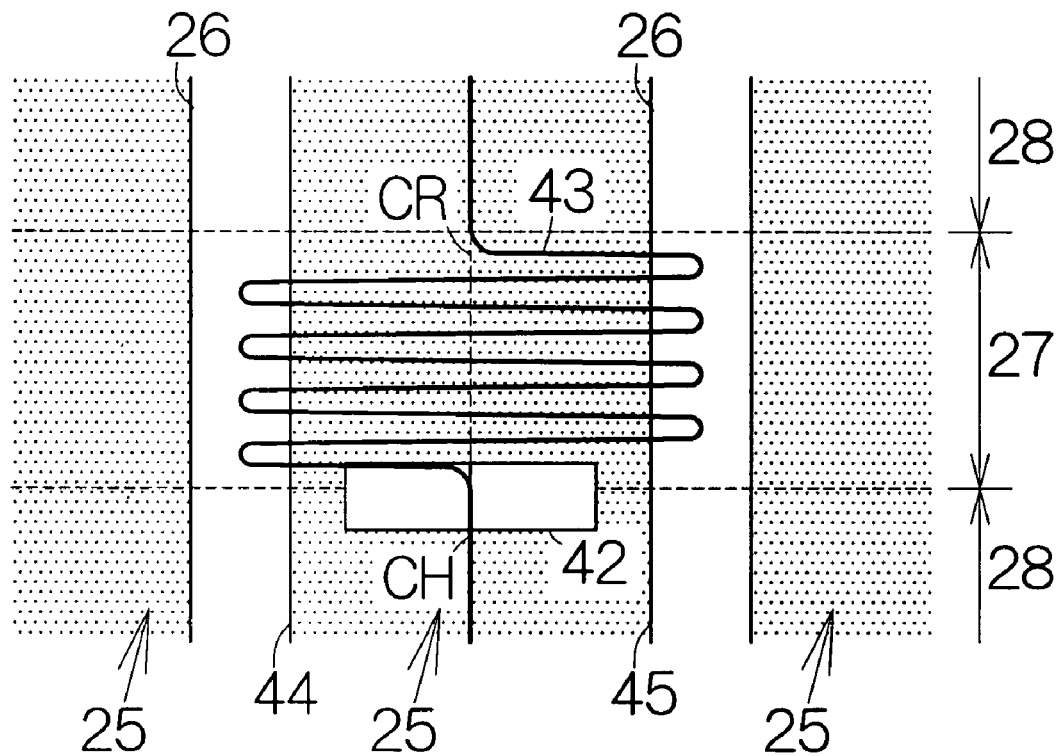
FIG. 7 is a partial plan view of the magnetic recording disk for schematically illustrating the movement path of an electromagnetic transducer.

Now, assume that the centerline CH of the read element 42 is aligned with the centerline CR of the recording track 25 during the rotation of the magnetic recording disk 14. As shown in FIG. 7, the read element 42 follows the recording track 25 based on the rotation of the magnetic recording disk 14, for example. When the read element 42 reaches the servo sector 27, the high frequency generating circuit 41 multiplexes the high frequency on the control signal. Vibration is thus induced in the head actuator 16. The flying head slider 22 oscillates in the radial direction of the magnetic recording disk 14 within the servo sector 27. The read element 42 moves along a movement path 43. for example. In this case, the read element 42 first moves outward in the radial direction. The flying head slider 22 moves by a predetermined distance from the centerline CR of the recording track 25 in the outward and inward directions, respectively.

The read element 42 moves in the lateral direction of the recording track 25 above the boundary 44, 45 between the recording track 25 and the separation tracks 26. When the read element 42 moves inward from the separation track 26 toward the centerline CR of the recording track 25, the output of the read element 42 increases to the maximum value from the minimum value. Here, as long as the magnetic field from the recording track 25 acts on the overall read element 42, the maximum value is maintained in a specific time period. When the read element further moves inward, the output of the read element 42 decreases to the minimum value from the maximum value. As long as the magnetic field acts on the read element 42 from the adjacent recording tracks 25, 25, the minimum value is maintained in a specific time period.

Figure 8:
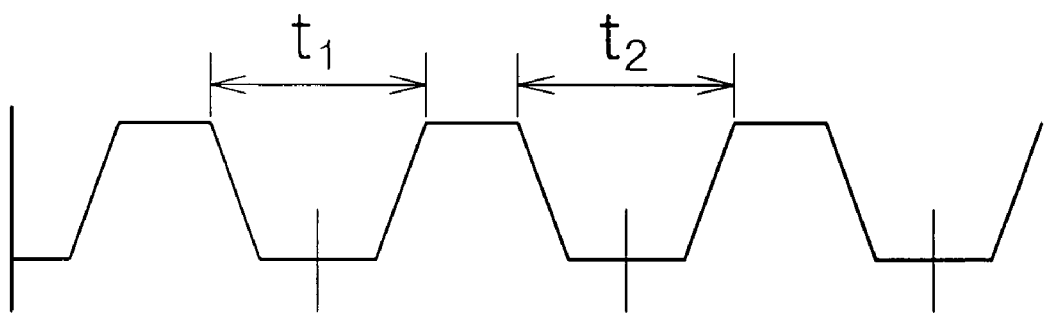
FIG. 8 is a graph showing the waveform of the output from the read element.

FIG. 8 illustrates the waveform of the output of the read element. The output processing circuit 39 generates the waveform signal based on the reproduction signal from the read element 42. As is apparent from FIG. 8, the output based on the inward movement takes the waveform identical to that of the output based on the outward movement. The same waveform repeats in the output during the outward and inward movements. The output processing circuit 39 calculates an interval between the consecutive maximum values, i.e., the time period $t_1$ and $t_2$. The difference is then calculated between the time periods $t_1$ and $t_2$. Since the read element 42 moves outward and inward by a predetermined distance from the centerline CR of the recording track 25, the time period $t_1$ and $t_2$ take the identical value. The difference "0 (zero)" can be obtained between the $t_1$ and $t_2$. Here, the time period $t_1$ and $t_2$ corresponds to the reference time period. As long as the difference takes "0 (zero)", the centerline CH of the read element 42 is aligned with the centerline CR of the recording track 25.

Figure 9:
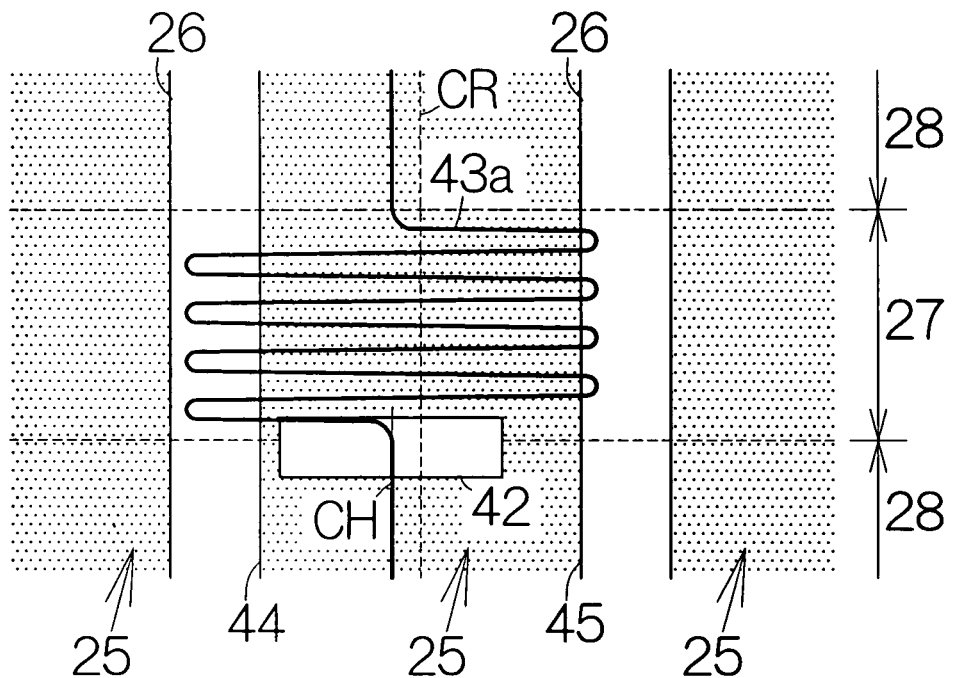
FIG. 9 is a partial plan view of the magnetic recording disk for schematically illustrating another movement path of the electromagnetic transducer.

For example, the read element 42 sometimes slightly shifts in the radial direction from the centerline CR of the recording track 25 because of the vibration of the flying head slider 22 or the magnetic recording disk 14 or other factors. As shown in FIG. 9, assume that the centerline CH of the read element 42 shifts outward from the centerline CR of the recording track 25, for example. The read element 42 follows the recording track 25 based on the rotation of the magnetic recording disk 14 in the same manner as described above. When the read element 42 reaches the servo sector 27, the high frequency generating circuit 41 multiplexes the high frequency on the control signal. Vibration is induced in the head actuator 16. The read element 42 moves along a movement path 43a, for example.

Figure 10:
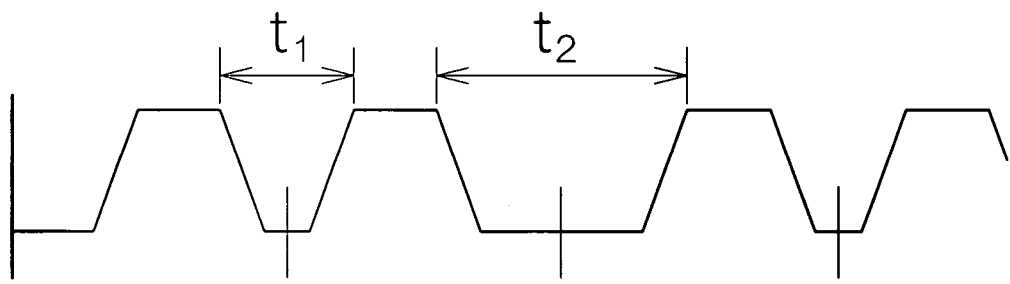
FIG. 10 is a graph showing the waveform of the output from the read element.
Figure 11:
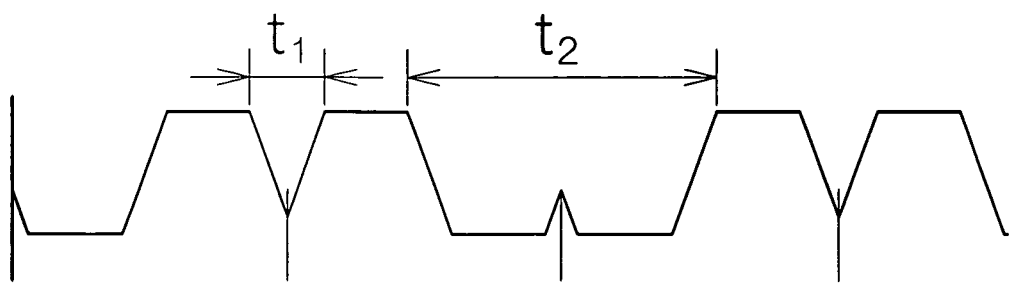
FIG. 11 is a graph showing the waveform of the output from the read element.

As is apparent from FIG. 9, the read element 42 first moves outward across the outward separation track 26. The read element 42 then moves inward. In this case, the output reaches the maximum value late. Specifically, the time period $t_1$ gets shorter than the aforementioned reference time period, while the time period $t_2$ gets longer than the reference time period, as shown in FIG. 10, for example. If the centerline CH of the read element 42 shifts outward by a larger amount from the centerline CR of the recording track 25, the time period $t_1$ still gets shorter than the aforementioned shorter time period $t_1$, while the time period $t_2$ gets longer than the aforementioned longer time period $t_2$, as shown in FIG. 11, for example. The output processing circuit 37 then calculates a difference between the time periods $t_1$ and $t_2$. The calculated difference corresponds to the deviation between the centerline CH of the read element 42 and the centerline CR of the recording track 25. The output processing circuit 37 in this manner generates the positional information indicating the position of the read element 42.

The generated positional information is taken into account to generate the control signal. The control signal is supplied to the voice coil motor 23. The voice coil motor 23 drives the head actuator 16 for rotation around the support shaft 17 by an amount corresponding to the magnitude of the control signal. The centerline CH of the read element 42 is thus aligned with the centerline CR of the recording track 25. When the read element 42 reaches the data sector 28, the high frequency generating circuit 41 stops multiplexing the high frequency. The read element 42 thereafter keeps following the centerline CR of the recording track 25. The write element is allowed to effect the write operation over the data sector 28. The write element writes information into the recording track 25 within the data sector 28. The read element 42 may read a bit data sequence recorded in the recording track 25 within the data sector 28 in the same manner. The tracking operation of the read element 42 is effected over the servo sector 27 while the read and write operations are realized within the data sector 28.

Figure 12:
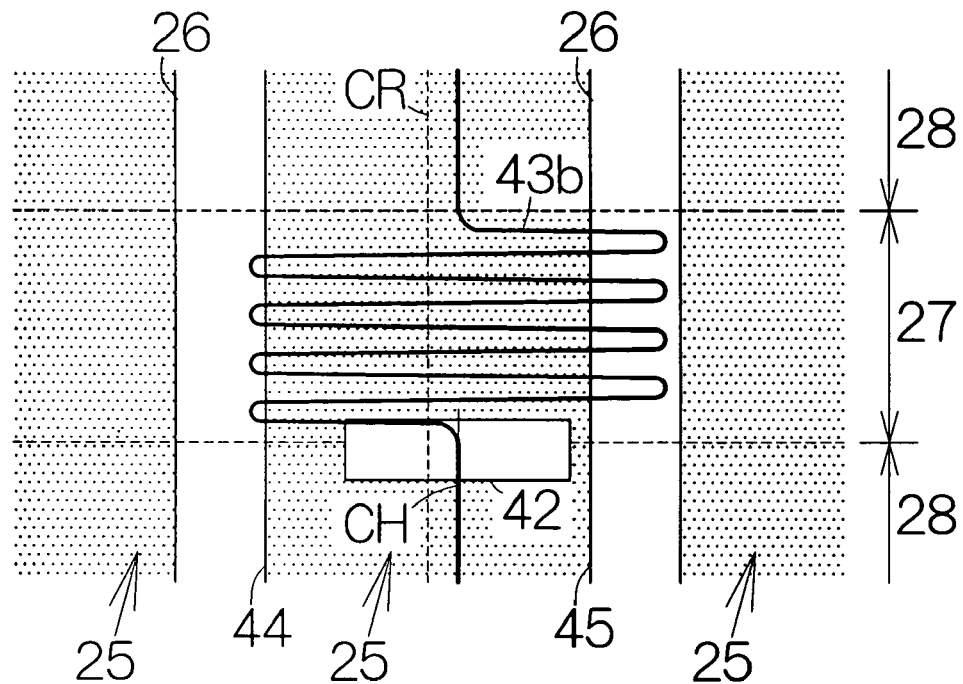
FIG. 12 is a partial plan view of the magnetic recording disk for schematically illustrating still another movement path of the electromagnetic transducer.

Next, assume that the centerline CH of the read element 42 shifts inward from the centerline CR of the recording track 25, as shown in FIG. 12, for example. The read element 42 follows the recording track 25 based on the rotation of the magnetic recording disk 14 in the same manner as described above. When the read element 42 reaches the servo sector 27, the high frequency generating circuit 41 multiplexes the high frequency on the control signal. Vibration is induced in the head actuator 16. The read element 42 moves along a movement path 43b, for example.

Figure 13:
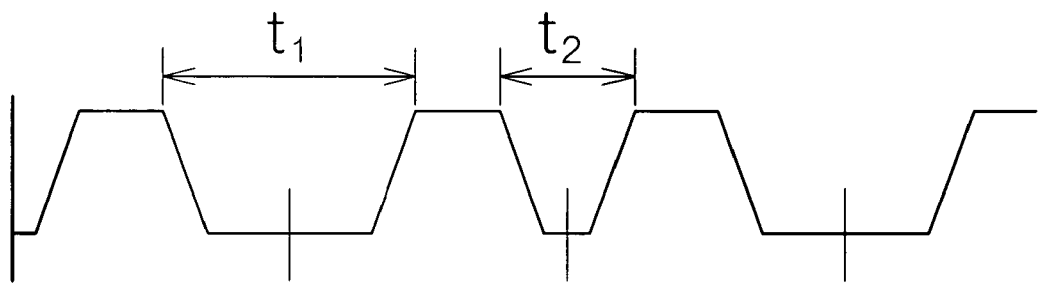
FIG. 13 is a graph showing the waveform of the output from the read element.
Figure 14:
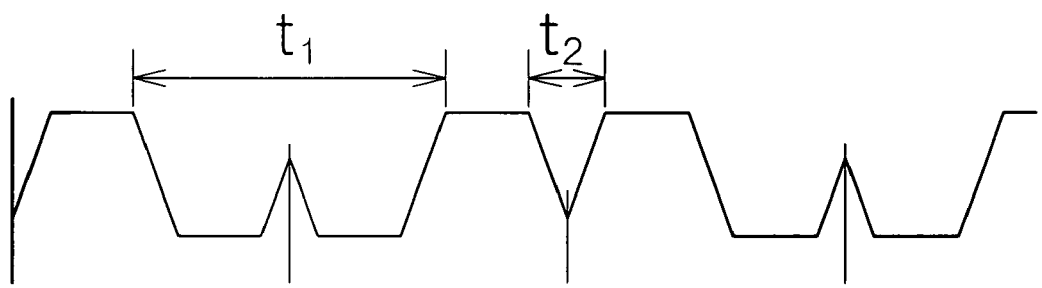
FIG. 14 is a graph showing the waveform of the output from the read element.

As is apparent from FIG. 12, the read element 42 moves inward across the inward separation track 26 after the initial outward movement. The read element 42 then again moves outward. In this case, the output reaches the maximum value earlier. Specifically, the time period $t_1$ gets longer than the aforementioned reference time period, while the time period $t_2$ gets shorter than the reference time period, as shown in FIG. 13, for example. If the centerline CH of the read element 42 shifts inward by a larger amount from the centerline CR of the recording track 25, the time period ti still gets longer than the aforementioned longer time period $t_1$, while the time period $t_2$ gets shorter than the aforementioned shorter time period $t_2$, as shown in FIG. 14, for example. The output processing circuit 37 then calculates the difference between the time periods ti and $t_2$. The output processing circuit 37 generates the positional information indicating the position of the read element 42 based on the difference. The generated positional information is taken into account to generate the control signal to the voice coil motor 23 for the head actuator 16 in the manner as described above.

The hard disk drive 11 allows the read element 42 to move across on the boundary 44, 45 between the recording track 25 and the separation track 26 in the tracking servo control. The read element 42 outputs the reproduction signal based on the recording track 25. The output of the read element 42 varies in response to the movement of the read element 42 in the radial direction, namely the elapsed time. The positional information indicating the position of the read head 42 is generated based on the mentioned variation in the output. The generated positional information is taken into account to generate the control signal to the head actuator 16. The read element 42 is allowed to follow the centerline CR of the recording track 25. The electromagnetic transducer can be positioned with a higher accuracy in the hard disk drive 11 in a facilitated manner. Moreover, the magnetic information for positioning, namely servo patterns can be omitted from the servo sectors 27. The operations can be simplified in the production of the magnetic recording disk 14. The operation time can be shortened.

Figure 15:
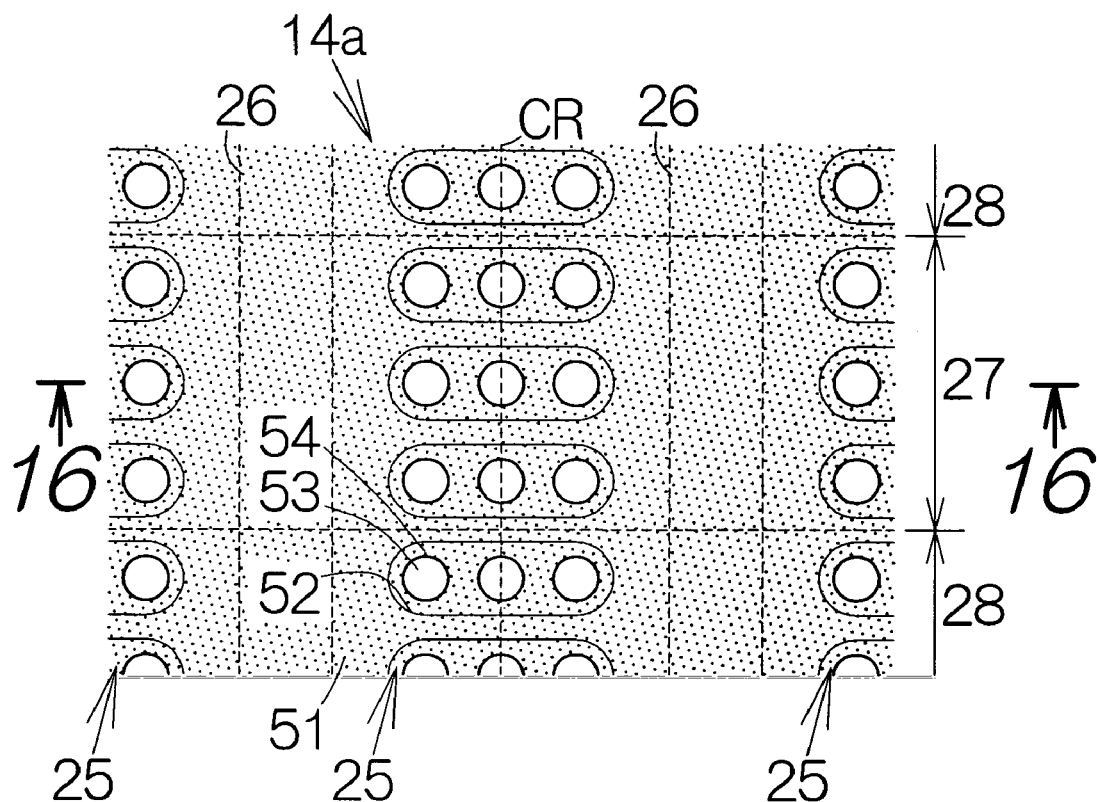
FIG. 15 is a plan view of a magnetic recording disk according to a modified example of the present invention.

As shown in FIG. 15, the present invention is also applicable to a magnetic recording disk 14a of the different type, for example. The magnetic recording disk 14a includes a non-magnetic layer 51 extending over the surface of the substrate 31 in place of the magnetic layer 32. Nanoholes 52, 52, . . . , are formed in the non-magnetic layer 51. The nanoholes 52 may be elongated in the radial direction of the magnetic recording disk 14a, for example. Magnetic bodies 53 are arranged in the nanohole 52 at equal intervals, for example. Non-magnetic body 54 serves to isolate the adjacent magnetic bodies 53 within the nanohole 52. The sequence of the nanoholes 52 in the circumferential direction of the magnetic recording disk 14a is utilized to form the recording track 25. Here, the non-magnetic layer 51 and the non-magnetic body 54 may be made of $Al_2O_3$, alumina, for example. Magnetic information is recorded in the magnetic bodies 53.

Figure 16:
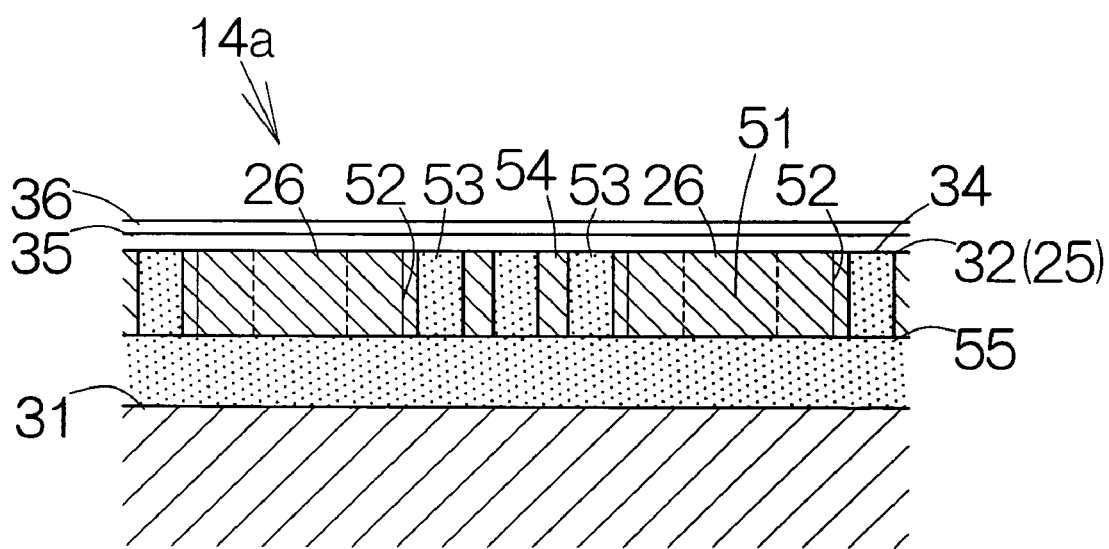
FIG. 16 is an enlarged partial sectional view taken along the line 16-16 in FIG. 15.

As shown in FIG. 16, the magnetic recording disk 14a includes a soft magnetic underlayer 55 extending on the surface of the substrate 31. The non-magnetic layer 51 is overlaid on the surface of the soft magnetic underlayer 55. Here, the nanoholes 52 have the depth enough to reach the soft magnetic underlayer 55. The flat surface 34 is defined over the surface of the non-magnetic layer 51. The flat surface 34 may be covered with the protection layer 35, the lubricating film 36, and the like, for example. The magnetic recording disk 14a of the type is suitable for perpendicular magnetic recording. The axis of easy magnetization is set in the magnetic bodies 53 in the direction perpendicular to the surface of the substrate 31. Either one of the south or north pole is established in the magnetic bodies 53 at the flat surface 34 within the servo sectors 27. A so-called single-pole head may be employed as the electromagnetic transducer mounted on the flying head slider 22.

Figure 17:
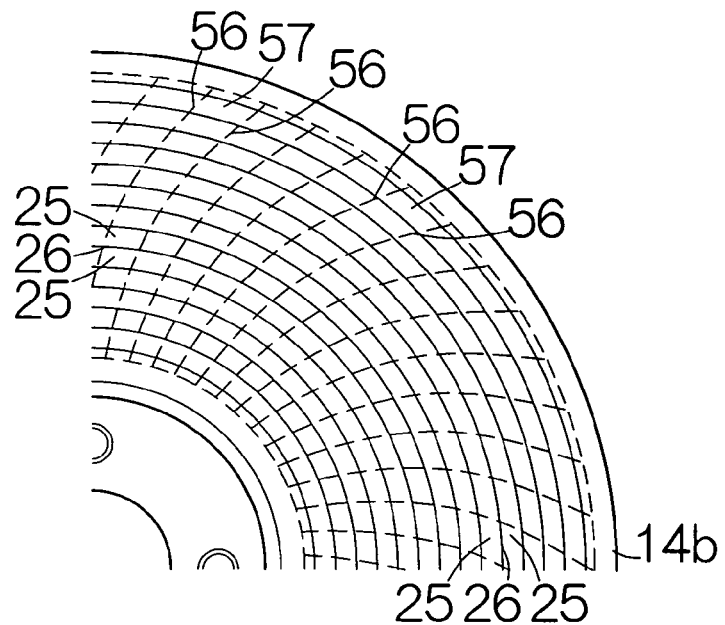
FIG. 17 is a partial plan view of a magnetic recording disk.

FIG. 17 schematically illustrates the structure of the magnetic recording disk 14b according to a second embodiment of the present invention. The magnetic recording disk 14b includes bent servo sectors 56 of sixty stripes, for example, defined on the front and back surfaces of the magnetic recording disk 14b. The servo sector 56 serves as a second section according to the present invention. The servo sectors 56 serve to fragment the recording tracks 25 and the separation tracks 26. The servo sectors 56 are made of a magnetic material. Servo patterns are established in the servo sectors 56 serving as the magnetic information for positioning. The shape of the servo sector 56 depends upon the movement path of the electromagnetic transducer or read head 42. Data sectors 57 are established between the adjacent servo sectors 56. The data sector 57 serves as a first section according to the present invention. Magnetic information is held in the recording tracks 25 within the data sectors 57.

The magnetic recording disk 14b includes the substrate 31, the protection layer 35, the lubricating film 36 in the same manner as the magnetic recording disk 14. The recording tracks 25 are established in the magnetic layer 32. The servo sectors 56 are likewise established in the magnetic layer 32. The magnetic recording disk 14b of the type is suitable for in-plane magnetic recording. The axis of easy magnetization is set in the recording tracks 25 in the direction in parallel with the surface of the magnetic layer 32. A conventional tracking controlling circuit, a conventional read signal circuit, a conventional output processing circuit, all not shown, and the like, may be incorporated within the hard disk drive 11 of the type in this case. The aforementioned high frequency generating circuit 41 may be omitted in this case. Like reference numerals are attached to structure or components equivalent to those of the aforementioned first embodiment.

The read element 42 follows the target recording track 25 based on the tracking servo control during the rotation of the magnetic recording disk 14b. The read element 42 outputs reproduction signals based on the servo pattern established on the magnetic recording disk 14b in the tracking servo control. The output processing circuit generates positional information for the voice coil motor 23 based on the phase shift of the reproduction signal. The generated positional information is utilized to generate the control signal. The control signal is supplied to the voice coil motor 23. The head actuator 16 is driven to cancel the deviation between the electromagnetic transducer and the centerline of the recording track 25. The tracking servo control is in this manner effected.

Next, a brief description will be made on a method of establishing the servo pattern on the magnetic recording disk 14b. The magnetic recording disk 14b is prepared prior to establishment of the servo pattern. The recording tracks 25 and the separation tracks 26 have been formed on the magnetic recording disk 14b. The servo sectors 56 and the data sectors 57 have likewise been formed on the magnetic recording disk 14b. The south and north poles may alternately be arranged at uniform intervals on the recording tracks 25 within the data sectors 57. The magnetic recording disk 14b is then assembled within the hard disk drive 11.

Figure 18:
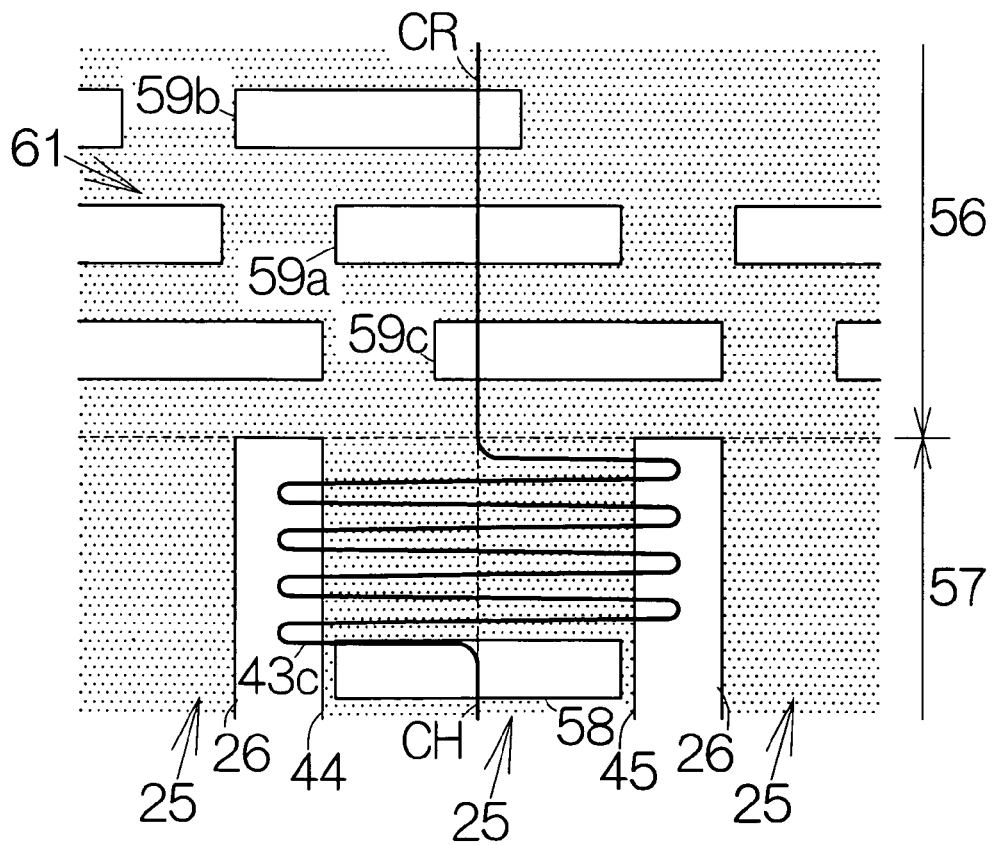
FIG. 18 is a partial plan view of the magnetic recording disk for schematically illustrating a servo pattern in a servo sector.

The hard disk drive 11 allows the spindle motor 15 to drive the magnetic recording disk 14b for rotation. The write element of the electromagnetic transducer 58 follows the recording track 25 on the magnetic recording disk 14b. Here, when the read element of the electromagnetic transducer 58 is located above the data sector 57, a high frequency is multiplexed on the control signal supplied to the voice coil motor 23. The high frequency may be supplied from the outside of the hard disk drive 11. Vibration is induced in the head actuator 16 based on the high frequency. The flying head slider 22 thus oscillates in the radial direction of the magnetic recording disk 14b. The electromagnetic transducer 58 moves along a movement path 43c as shown in FIG. 18, for example.

The output processing circuit receives the output from the read element of the electromagnetic transducer 58. The tracking servo control is thus effected in the same manner as the aforementioned first embodiment. The output processing circuit generates the positional information indicating the position of the write element based on the difference between the time periods $t_1$ and $t_2$. The generated positional information is utilized to generate the control signal. The control signal is supplied to the voice coil motor 23. The voice coil motor 23 drives the head actuator 16 for rotation around the support shaft 17 based on the magnitude of the control signal. The centerline CH of the electromagnetic transducer 58 is thus aligned with the centerline CR of the recording track 25. A software program may be installed in the hard disk drive 11 for effecting the tracking servo control, for example. The tracking controlling circuit and the output processing circuit may operate in accordance with the implemented software program.

When the electromagnetic transducer 58 is positioned above the servo sectors 56, the write element is allowed to effect the write operation. The write element writes the magnetic information for positioning at predetermined regions within the servo sectors 56. Inverted magnetized regions 59a are thus established in the servo sectors 56 in accordance with the servo patterns 61. The centerline CH of the electromagnetic transducer 58 is then forced to shift outward by a predetermined amount in the radial direction of the magnetic recording disk 14b based on the tracking servo control, for example. The magnetic information for positioning is written at predetermined regions within the servo sectors 56. Accordingly, the inverted magnetized regions 59b are established in accordance with the servo patterns 61. The centerline CH of the electromagnetic transducer 58 is thereafter forced to shift inward by a predetermined amount in the radial direction of the magnetic recording disk 14b based on the tracking servo control. The magnetic information for positioning is written at predetermined regions within the servo sectors 56. Accordingly, the inverted magnetized regions 59c are established in accordance with the servo patterns 61. The servo patterns 61 can in this manner be established in the servo sectors 56.

The hard disk drive 11 in this case allows establishment of the servo pattern based on the tracking servo control. Since the flying head slider 22 oscillates in the radial direction of the magnetic recording disk 14b in the manner as described above, the output of the reproduction signal varies in response to the movement of the electromagnetic transducer 58, namely the elapsed time. The positional information indicating the position of the electromagnetic transducer 58 can thus be generated based on the mentioned variation in the output. The generated positional information is taken into account to generate the control signal to the head actuator 16. The read element can be positioned at a predetermined position on the recording track 25, for example. The servo pattern 61 is established in the servo sector 56. The servo pattern 61 can be positioned with a higher accuracy. Moreover, it is not necessary to insert a pin, for driving the head actuator 16 to position the electromagnetic transducer relative to the magnetic recording disk, into enclosure 12 of the hard disk drive 11. An insertion hole for receiving the pin can be omitted from the enclosure 12 of the hard disk drive 11.

Figure 19:
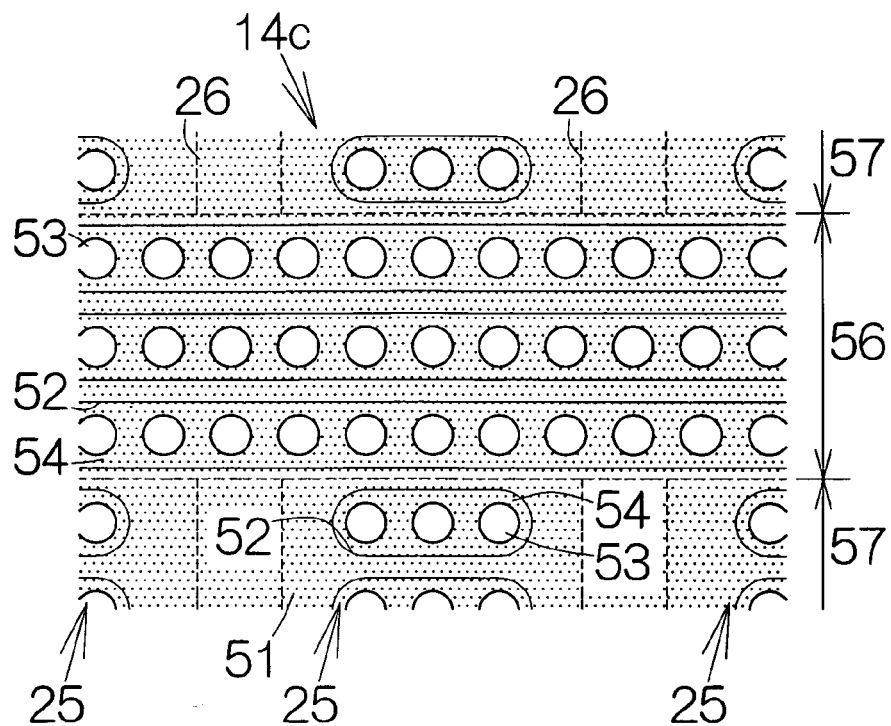
FIG. 19 is an partial plan view of a magnetic recording disk.

As shown in FIG. 19, the present invention is also applicable to a magnetic recording disk 14c of the different type. The magnetic recording disk 14c of this type includes the non-magnetic layer 51 extending over the surface of the substrate 31 in the same manner as the aforementioned magnetic recording disk 14a. The nanoholes 52 may continuously extend in the radial direction of the magnetic recording disk 14b in the servo sectors 56. The magnetic bodies 53 are arranged within the nanohole 52 at uniform intervals. The non-magnetic body 54 may be utilized to isolate the adjacent magnetic bodies 53 within the nanoholes 52. The servo pattern 61 may be established based on the magnetic bodies 53 within the servo sectors 56. The magnetic recording disk 14c of the type may be suitable for perpendicular magnetic recording. Like reference numerals are attached to structure or components equivalent to those of the aforementioned embodiments.

A microactuator, not shown, may be interposed between the head suspension 21 and the flying head slider 22 in the hard disk drive 11. A piezoelectric element, such as a PZT element, may be employed as the microactuator, for example. The microactuator serves to induce a relative movement between the head suspension 21 and the flying head slier 22 based on a control signal. The relative movement causes the rotation of the flying head slider 22 at the tip end of the head suspension 21 around an axis parallel to the support shaft 17. Like reference numerals are attached to structure or components equivalent to those of the aforementioned embodiments.

Figure 20:
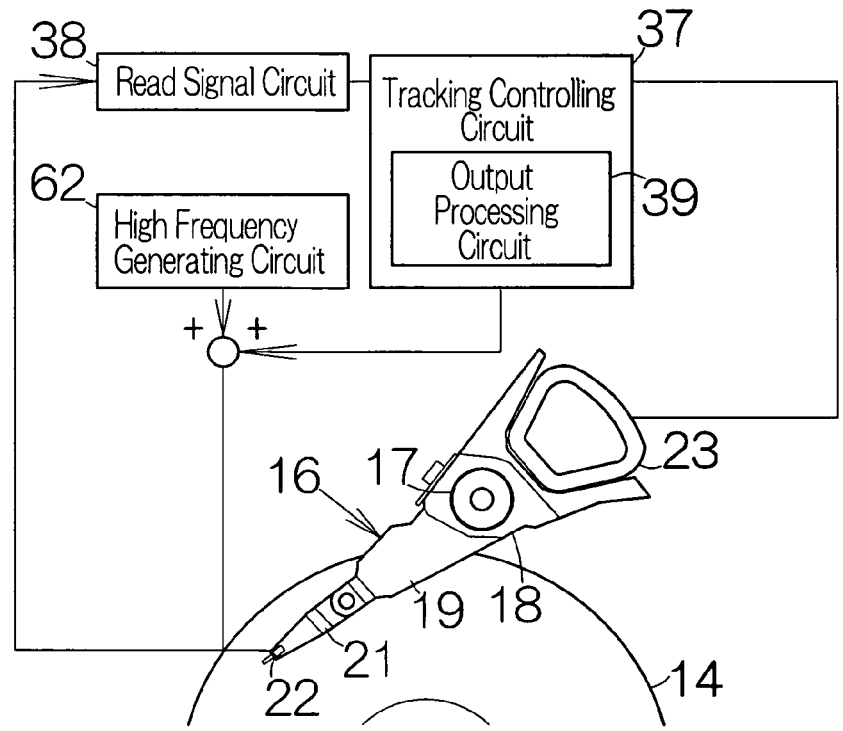
FIG. 20 is a block diagram schematically illustrating a system for tracking servo control according to a modified example.

As shown in FIG. 20, the aforementioned tracking controlling circuit 37 is connected to the microactuator. The tracking controlling circuit 37 determines the amount of rotation for the head actuator 16 around the support shaft 17 and the amount of rotation for the flying head slider 22 around the axis based on the deviation between the electromagnetic transducer on the flying head slider 22 and a predetermined orbit. A fine movement of the flying head slider 22 in combination with a gross movement of the head actuator 16 enables tracking of the read and write elements on the electromagnetic transducer along the recording track 25 with a still higher accuracy.

The output processing circuit 39 detects the variation in the output from the read signal circuit 38 in the same manner as mentioned above. The output processing circuit 39 generates positional information indicating the position of the electromagnetic transducer based on the detected variation. The control signals are generated based on the generated positional information. The control signals are respectively supplied to the voice coil motor 23 and the microactuator. The voice coil motor 23 drives the head actuator 16 for rotation around the support shaft 17 based on the magnitude of the supplied control signal. The microactuator concurrently drives the flying head slider for rotation around the axis based on the magnitude of the supplied control signal.

A high frequency generating circuit 62 serves to intermittently multiplex the high frequency on the control signal supplied to the microactuator. The flying head slider 22 is thus forced to oscillate in the radial direction of the magnetic recording disk 14 based on the multiplexed high frequency. The output processing circuit 39 generates positional information indicating the position of the electromagnetic transducer based on the oscillation of the flying head slider 22 in the manner as mentioned above. The control signals are generated based on the positional information. The control signals are respectively supplied to the voice coil motor 23 and the microactuator. The tracking servo control is in this manner effected.

What is claimed is:

1. A method of controlling tracking of a head in a recording disk drive, comprising:
    driving a recording disk for rotation, the recording disk including recording tracks and non-magnetic separation tracks each interposed between adjacent ones of the recording tracks, the recording tracks and the non-magnetic separation tracks tracing concentric circles over servo sectors and data sectors;
    inducing an oscillation of the head in a lateral direction across a boundary between at least select one of the separation tracks and select one of the recording, tracks adjacent the select one of the separation tracks;
    detecting a variation in a reproduction signal supplied from the head which reads magnetic information of at least the select one of the recording tracks during the lateral movement across the boundary;
    generating positional information indicating a position of the head based on the variation; and
    generating a control signal based on the positional information so as to drive the head in the lateral direction for cancellation of a deviation between the head and a centerline of the select one of the recording tracks, a high frequency being multiplexed on the control signal so as to induce the oscillation only when the head is positioned over the servo sectors.

2. The method according to claim 1, wherein the recording tracks are made of a magnetic material.

3. The method according to claim 1, wherein each of the recording tracks includes:
    a non-magnetic layer;
    nanoholes formed in the non-magnetic layer;
    and magnetic bodies arranged in the nanoholes.

4. The method according to claim 1, wherein the frequency of the high frequency is set higher than a servo band employed in a tracking servo control.

5. A recording disk drive comprising:
    a recording disk defining recording tracks and non-magnetic separation tracks over servo sectors and data sectors, the non-magnetic separation tracks each isolating recording tracks from each other;
    a head opposed to the surface of the recording disk;
    a driving mechanism supporting the head so as to move the head in a lateral direction of the recording tracks;
    a tracking controller circuit designed to detect variation of a reproduction signal supplied from the head which reads magnetic information of at least select one of the recording tracks during the lateral movement across the boundary, the tracking controller circuit generating a control signal for driving the driving mechanism so as to cancel a deviation between the head and a centerline of the select one based on positional information indicating a position of the head based on the variation; and
    a high frequency generating circuit multiplexing a high frequency on the control signal generated only when the head is positioned over the servo sector.

6. The recording drive according to claim 5, wherein the recording tracks are made of a magnetic material.

7. The recording disk drive according to claim 5, wherein each of the recording tracks includes:
    a non-magnetic layer;
    nanoholes formed in the non-magnetic layer;
    and magnetic bodies arranged in the nanoholes.

8. The recording disk drive according to claim 5, wherein the frequency of the high frequency is set higher than a servo band employed in a tracking servo control.

9. A method of controlling tracking of a head on a select recording track on a disk medium, the select recording track being interposed between first and second non-magnetic tracks tracing concentric circles, comprising:

vibrating the head in a lateral direction of the select recording track, in order to move a first outer edge defined on a read element of the head beyond a boundary between the select recording track and the first non-magnetic track, and in order to move a second outer edge defined on the read element of the head beyond a boundary between the select recording track and the second non-magnetic track, the first outer edge being opposite the second outer edge;

receiving a reproduction signal from the read element of the head during vibration in the lateral direction;

generating positional information indicating a position of the head on the select recording track based on the reproduction signal; and generating a control signal based on the positional information so as to drive the head in the lateral direction for cancellation of a deviation between the head and the centerline of the select recording track, a high frequency being multiplexed on the control signal so as to induce the vibration only when the head is positioned over a servo sector.

10. The method according to claim 9, wherein the frequency of the high frequency is set higher than a servo band employed in a tracking servo control.

11. The method according to claim 9, wherein the first non-magnetic track is interposed between the select recording track and a first recording track, the second non-magnetic track is interposed between the select recording track and a second recording track, and the head is vibrated in order to meet at least one of conditions including a condition that the first outer edge move beyond a boundary between the first non-magnetic track and the first recording track, and a condition that the second outer edge move beyond a boundary between the second non-magnetic track and the second recording track.

* * * * *

UNITED STATES PATENT AND TRADEMARK OFFICE
CERTIFICATE OF CORRECTION

PATENT NO. : 7,397,627 B2 Page 1 of 1
APPLICATION NO. : 11/141686
DATED : July 8, 2008
INVENTOR(S) : Takahiro Imamura It is certified that error appears in the above-identified patent and that said Letters Patent is hereby corrected as shown below:

In the Claims:

Col. 12, line 16, delete "recording, tracks" and insert --recording tracks--.

Signed and Sealed this

Twentieth Day of January, 2009

JON W. DUDAS
*Director of the United States Patent and Trademark Office*